(12) United States Patent
Sakamoto et al.

(10) Patent No.: US 10,150,481 B2
(45) Date of Patent: Dec. 11, 2018

(54) ROUGH TERRAIN VEHICLE

(71) Applicant: HONDA MOTOR CO., LTD, Tokyo (JP)

(72) Inventors: Naoki Sakamoto, Wako (JP); Yasuhiro Nozaki, Wako (JP); Naoki Kobayashi, Wako (JP); Dai Arai, Wako (JP); Takao Kochi, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 15/473,806

(22) Filed: Mar. 30, 2017

(65) Prior Publication Data

US 2017/0282923 A1    Oct. 5, 2017

(30) Foreign Application Priority Data

Mar. 31, 2016 (JP) .................. 2016-071541

(51) Int. Cl.
*B60W 10/02*    (2006.01)
*B60W 30/188*    (2012.01)
(Continued)

(52) U.S. Cl.
CPC ...... *B60W 30/1884* (2013.01); *B60W 10/023* (2013.01); *B60W 10/06* (2013.01);
(Continued)

(58) Field of Classification Search
None
See application file for complete search history.

(56) References Cited

U.S. PATENT DOCUMENTS 4,821,854 A * 4/1989 Koshizawa .......... B60W 10/02
                                                    477/74
4,947,970 A * 8/1990 Miller ................. F16D 48/066
                                                    477/30
(Continued)

FOREIGN PATENT DOCUMENTS

EP    1 258 388 A2    11/2002
EP    2 186 701 A1    5/2010
(Continued)

OTHER PUBLICATIONS

Office Action dated Mar. 20, 2018, issued in counterpart Japanese Application No. 2016-071541, with English translation. (10 pages).

(Continued)

*Primary Examiner* — Dirk Wright
(74) *Attorney, Agent, or Firm* — Westerman, Hattori, Daniels & Adrian, LLP (57) ABSTRACT

In a rough terrain vehicle, at a time of preparing to start movement, in a case that a left paddle switch and a right paddle switch are operated together with an accelerator pedal, an ECU disengages a clutch of an automatic transmission, and causes an output of an engine to increase. On the other hand, at a time of starting movement, in a case that the left paddle switch and the right paddle switch are returned to their initial positions, the ECU engages the clutch and transmits the output of the engine from the engine to vehicle wheels via the automatic transmission, to thereby rapidly start movement of the rough terrain vehicle.

5 Claims, 3 Drawing Sheets

(51) Int. Cl.
  *B60W 10/06* (2006.01)
  *B60W 30/18* (2012.01)
  *B60W 40/09* (2012.01)
  *F02D 41/00* (2006.01)

(52) U.S. Cl.
  CPC ...... *B60W 30/18027* (2013.01); *B60W 40/09* (2013.01); *F02D 41/0097* (2013.01); *B60W 2510/0638* (2013.01); *B60W 2540/10* (2013.01); *B60W 2540/16* (2013.01); *B60W 2710/021* (2013.01); *B60W 2710/0627* (2013.01); *B60W 2710/0644* (2013.01); *F02D 2200/602* (2013.01)

(56) References Cited

U.S. PATENT DOCUMENTS

| | | | | |
|---|---|---|---|---|
| 6,142,909 A * | 11/2000 | Drexl | ............... | B60W 10/02 477/91 |
| 6,463,821 B1 * | 10/2002 | Reed, Jr. | ............... | F16D 21/06 192/103 C |
| 7,090,617 B2 * | 8/2006 | Bassler | ............... | F16D 48/062 477/171 |
| 7,630,811 B2 * | 12/2009 | Jiang | ............... | B60W 10/02 192/48.8 |
| 7,704,189 B2 * | 4/2010 | Baur | ............... | B60W 10/02 477/115 |
| 7,779,714 B2 * | 8/2010 | Baldwin | ............... | B60W 30/18027 477/116 |
| 7,946,953 B2 * | 5/2011 | Koga | ............... | F16H 61/0213 477/78 |
| 8,515,638 B2 * | 8/2013 | Saitoh | ............... | F16D 48/06 192/31 |
| 8,690,728 B2 * | 4/2014 | Griffin | ............... | B60W 10/02 477/77 |
| 8,935,966 B2 * | 1/2015 | Arai | ............... | F16D 48/08 74/330 |
| 9,556,955 B2 * | 1/2017 | Dunfee, II | ............... | F16H 61/08 |
| 2005/0071065 A1 * | 3/2005 | Zimmermann | ............... | B60W 10/02 701/51 |
| 2011/0125377 A1 | 5/2011 | Saitoh | | |
| 2014/0228168 A1 | 8/2014 | Kaufman et al. | | |
| 2015/0090510 A1 | 4/2015 | Yoshino et al. | | |

FOREIGN PATENT DOCUMENTS

| | | |
|---|---|---|
| JP | 61-143231 A | 6/1986 |
| JP | 8-218928 A | 8/1996 |
| JP | 2002-337570 A | 11/2002 |
| JP | 2009-78713 A | 4/2009 |
| JP | 2011-112094 A | 6/2011 |
| JP | 2015-67022 A | 4/2015 |

OTHER PUBLICATIONS

Office Action dated Aug. 29, 2017, issued in counterpart Japanese Application No. 2016-071541, with partial English translation. (6 pages).

Office Action dated Mar. 23, 2018, issued in counterpart Canadian Application No. 2962991. (4 pages).

* cited by examiner

ROUGH TERRAIN VEHICLE

CROSS-REFERENCE TO RELATED APPLICATION

This application is based upon and claims the benefit of priority from Japanese Patent Application No. 2016-071541 filed on Mar. 31, 2016, the contents of which are incorporated herein by reference.

BACKGROUND OF THE INVENTION

Field of the Invention

The present invention relates to a rough terrain vehicle including an engine and an accelerator operating unit.

Description of the Related Art

Conventionally, rough terrain vehicles, which are capable of traveling on rough terrain, are known (see, for example, Japanese Laid-Open Patent Publication No. 2015-067022). In comparison with general vehicles, rough terrain vehicles have a simpler structure in which there are not incorporated, for example, a TBW (throttle-by-wire) type of throttle control mechanism, or a clutch mechanism in which clutch operations are performed manually by a vehicle occupant.

SUMMARY OF THE INVENTION

Incidentally, the present applicant has been involved in the development of a rough terrain vehicle, in which a twin-clutch type of automatic transmission (dual clutch transmission), which is one type of automatic transmission, is incorporated in the rough terrain vehicle, and which enables a vehicle occupant to operate a clutch operating unit such as a paddle shift or the like, wherein clutch operations can be performed manually. In this manner, while on the one hand the twin-clutch type automatic transmission is incorporated therein, there has not yet been established a method, in relation to a rough terrain vehicle in which a TBW mechanism is not incorporated, in which the engine rotational speed of the engine is increased before starting movement (when preparing to start movement), and the ability to accelerate is increased when the vehicle actually starts moving.

More specifically, in a conventional rough terrain vehicle, without a TBW mechanism being incorporated therein, it is not possible to rapidly start the vehicle automatically. Further, since an operating unit by which the vehicle occupant performs clutch operations is not incorporated therein, it also is impossible to rapidly start movement after maintaining the engine rotational speed at a high rotational speed during the time of preparing to start movement.

Thus, the present invention has the object of providing a rough terrain vehicle, which enables preparation for start of movement of the rough terrain vehicle, in which a twin-clutch type automatic transmission is incorporated, but a TBW mechanism is not incorporated therein.

A rough terrain vehicle according to the present invention includes an engine, and an accelerator operating unit operated by a vehicle occupant, and further includes the following features listed below.

First Feature: The rough terrain vehicle further includes a twin-clutch type automatic transmission configured to transmit an output of the engine to vehicle wheels, a clutch operating unit operated by the vehicle occupant, and a control unit configured to control traveling of the rough terrain vehicle, by controlling the engine and the twin-clutch type automatic transmission on the basis of operations of the accelerator operating unit and/or the clutch operating unit by the vehicle occupant.

In this case, the control unit, at a time of preparing to start movement of the rough terrain vehicle, in a case that the clutch operating unit and the accelerator operating unit are operated, disengages a clutch of the twin-clutch type automatic transmission, and causes the output of the engine to increase.

On the other hand, the control unit, at a time of starting movement of the rough terrain vehicle, in a case that operation of the clutch operating unit is canceled, engages the clutch and transmits the output of the engine from the engine to the vehicle wheels via the twin-clutch type automatic transmission, to thereby start movement of the rough terrain vehicle.

Second Feature: The rough terrain vehicle further includes a first clutch mode and a second clutch mode which exhibit respective relationships between an engine rotational speed of the engine and a clutch hydraulic pressure amount of the clutch. In this case, at the time of preparing to start movement, the control unit sets the clutch hydraulic pressure amount corresponding to the engine rotational speed on the basis of the first clutch mode, whereas at the time of starting movement, the control unit sets the clutch hydraulic pressure amount corresponding to the engine rotational speed on the basis of the second clutch mode.

Third Feature: In comparison with the second clutch mode, the first clutch mode exhibits a smaller clutch hydraulic pressure amount with respect to the same engine rotational speed.

Fourth Feature: In the case that the clutch operating unit is operated by the vehicle occupant during traveling of the rough terrain vehicle, the control unit sets the clutch hydraulic pressure amount corresponding to the engine rotational speed on the basis of the first clutch mode.

Thereafter, in the case that operation of the clutch operating unit is canceled, the control unit sets the clutch hydraulic pressure amount corresponding to the engine rotational speed on the basis of the second clutch mode, to thereby engage the clutch and transmit the output of the engine from the engine to the vehicle wheels via the twin-clutch type automatic transmission, whereby the rough terrain vehicle is accelerated again.

Fifth Feature: During the time of preparing to start movement, in the case that the engine rotational speed is greater than or equal to a predetermined rotational speed, the control unit cuts fuel injection to the engine, and maintains the engine rotational speed at the predetermined rotational speed.

Sixth Feature: The accelerator operating unit is an accelerator pedal, and the clutch operating unit is a paddle shift disposed on a handle steered by the vehicle occupant.

In this case, at the time of preparing to start movement, in a case that the accelerator pedal is depressed together with the paddle shift being operated, the control unit disengages the clutch and causes the output of the engine to increase. On the other hand, at the time of starting movement, in a case that the paddle shift is returned to its initial position, the control unit engages the clutch and transmits the output of the engine from the engine to the vehicle wheels via the twin-clutch type automatic transmission.

Seventh Feature: The paddle shift is disposed on each of both left and right sides of the handle.

In this case, at the time of preparing to start movement, in a case that the accelerator pedal is depressed together with the paddle shift on each of the sides being operated, the control unit disengages the clutch and causes the output of the engine to increase. On the other hand, at the time of starting movement, in a case that the paddle shift on each of the sides is returned to its initial position, the control unit engages the clutch and transmits the output of the engine from the engine to the vehicle wheels via the twin-clutch type automatic transmission.

According to the first feature of the present invention, at the time of preparing to start movement, in a case that the clutch operating unit and the accelerator operating unit are operated, the clutch of the twin-clutch type automatic transmission is disengaged, and the output of the engine is increased. Consequently, before starting movement of the rough terrain vehicle, in a state in which the rough terrain vehicle is stopped, a high engine rotational speed can be maintained without transmitting the output of the engine to the vehicle wheels.

On the other hand, at the time of starting movement, in a case that operation of the clutch operating unit is canceled, the clutch is engaged, and the output of the engine is transmitted from the engine to the vehicle wheels via the twin-clutch type automatic transmission. In this case, since up to a time immediately before movement is started the engine is maintained at a high engine rotational speed, by the occupant operating the accelerator operating unit and setting the throttle at an arbitrary throttle opening, the ability to accelerate the rough terrain vehicle upon start of movement can be enhanced.

Thus, in accordance with the first feature, in a rough terrain vehicle in which a twin-clutch type automatic transmission is incorporated, but a TBW mechanism is not incorporated therein, by controlling the engine and the twin-clutch type automatic transmission on the basis of operations of the clutch operating unit and the accelerator operating unit by the vehicle occupant, the rough terrain vehicle can start to move in a state in which the ability of the rough terrain vehicle to accelerate is enhanced.

In this instance, the phrase "disengages the clutch" may refer to a state in which the clutch is completely disengaged, or may refer to a half-clutch state, which is a state in which the clutch is not completely engaged.

According to the second feature of the present invention, at the time of preparing to start movement, the clutch hydraulic pressure amount corresponding to the engine rotational speed is set on the basis of the first clutch mode. On the other hand, at the time of starting of movement, the clutch hydraulic pressure amount corresponding to the engine rotational speed is set on the basis of the second clutch mode. Thus, it is possible to efficiently control engagement and disengagement of the clutch that constitutes the twin-clutch type automatic transmission.

According to the third feature of the present invention, the hydraulic pressure amount of the first clutch mode is set to be smaller than the hydraulic pressure amount of the second clutch mode with respect to the same engine rotational speed. Thus, at the time of preparing to start movement, in a state in which the twin-clutch type automatic transmission is placed in a half-clutch state, the engine rotational speed can be raised to the greatest extent possible, to a degree at which the rough terrain vehicle does not actually start to move. As a result, by connecting or fully engaging the clutch at the time of starting, it is possible to initiate movement of the rough terrain vehicle.

According to the fourth feature of the present invention, by operating the clutch operating unit during traveling of the rough terrain vehicle, the same conditions are kept as during the time of preparations for start of movement, and thereafter, if operation of the clutch operating unit is canceled, the rough terrain vehicle is accelerated again. In accordance with this feature, even in the case that the engine rotational speed is decreased during traveling, the engine rotational speed can easily be raised, and the rough terrain vehicle can be made to accelerate again. Further, during traveling, the occupant can again realize the sense of acceleration again.

Further, by the vehicle occupant operating the accelerator operating unit during the time that preparations for start of movement of the rough terrain vehicle are undertaken, although the output of the engine with respect to the engine rotational speed becomes greater up to a certain fixed value, thereafter, the output of the engine decreases. As a result, when the clutch is fully engaged in a state with the output of the engine being decreased, it becomes difficult to start movement of the rough terrain vehicle. Further, since a TBW mechanism is not incorporated in the rough terrain vehicle, adjustment of the throttle valve also is difficult.

Thus, according to the fifth feature of the present invention, during the time of preparing to start movement, in the case that the engine rotational speed is greater than or equal to a predetermined rotational speed, fuel injection to the engine is cut, and the engine rotational speed is maintained at the predetermined rotational speed. Consequently, since the clutch is fully engaged in a state while the engine is maintained at maximum output, the rough terrain vehicle possesses a high capability to accelerate, and movement thereof can be easily started.

According to the sixth feature of the present invention, since the vehicle occupant can depress the accelerator pedal while operating the paddle shift and simultaneously gripping the handle, ease of operation of the rough terrain vehicle is enhanced. As a result, during preparations for starting as well as when starting movement, responsive to the operations of the occupant, appropriate controls can be effected with respect to the engine and the twin-clutch type automatic transmission.

According to the seventh feature of the present invention, the paddle shifts are disposed respectively on both left and right sides of the handle, and when operations are performed using the left and right paddle shifts, and the accelerator pedal is depressed, the clutch is disengaged and the output of the engine is made to increase. Consequently, it is possible to efficiently raise the engine rotational speed at the time of undertaking preparations for start of movement. On the other hand, when the left and right paddle shifts are returned to their initial positions, since the clutch is engaged and the output of the engine is transmitted to the vehicle wheels through the twin-clutch type automatic transmission, it is possible to start movement of the rough terrain vehicle with a strong capability of accelerating.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a rough terrain vehicle according to the present invention will be described in detail below with reference to the accompanying drawings.

Configuration of the Present Embodiment

Figure 1:
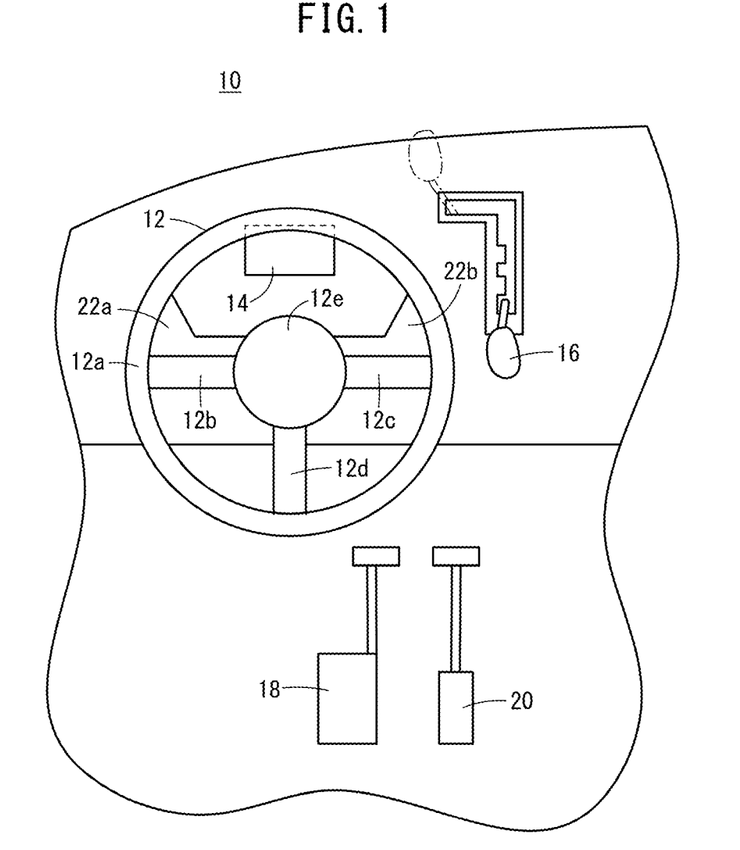
FIG. 1 is a partial view in a rough terrain vehicle according to the present embodiment when a vehicle occupant looks in a forward direction.

FIG. 1 is a partial view in a rough terrain vehicle 10 according to the present embodiment when a vehicle occupant who is seated in a seat looks in a forward direction.

In the rough terrain vehicle 10, a handle 12 steered by the vehicle occupant is provided in front of the vehicle occupant. A meter 14 for displaying various information is arranged in front of the handle 12, and a shift lever 16 is provided on the right side of the handle 12. Further, a brake pedal 18 and an accelerator pedal 20 (accelerator operating unit) are arranged downwardly of the handle 12 and the shift lever 16.

The handle 12 is a steering wheel made up from a wheel rim 12a, three spokes 12b to 12d that extend radially inward from the wheel rim 12a, and a pad 12e that connects the respective spokes 12b to 12d.

A left paddle switch 22a (clutch operating unit, paddle shift) extends toward the wheel rim 12a along the left side spoke 12b from the pad 12e, whereas a right paddle switch 22b (clutch operating unit, paddle shift) extends toward the wheel rim 12a along the right side spoke 12c from the pad 12e. The left paddle switch 22a and the right paddle switch 22b are swingably movable back and forth by operations of the vehicle occupant about proximal ends thereof on the side of the pad 12e.

Figure 2:
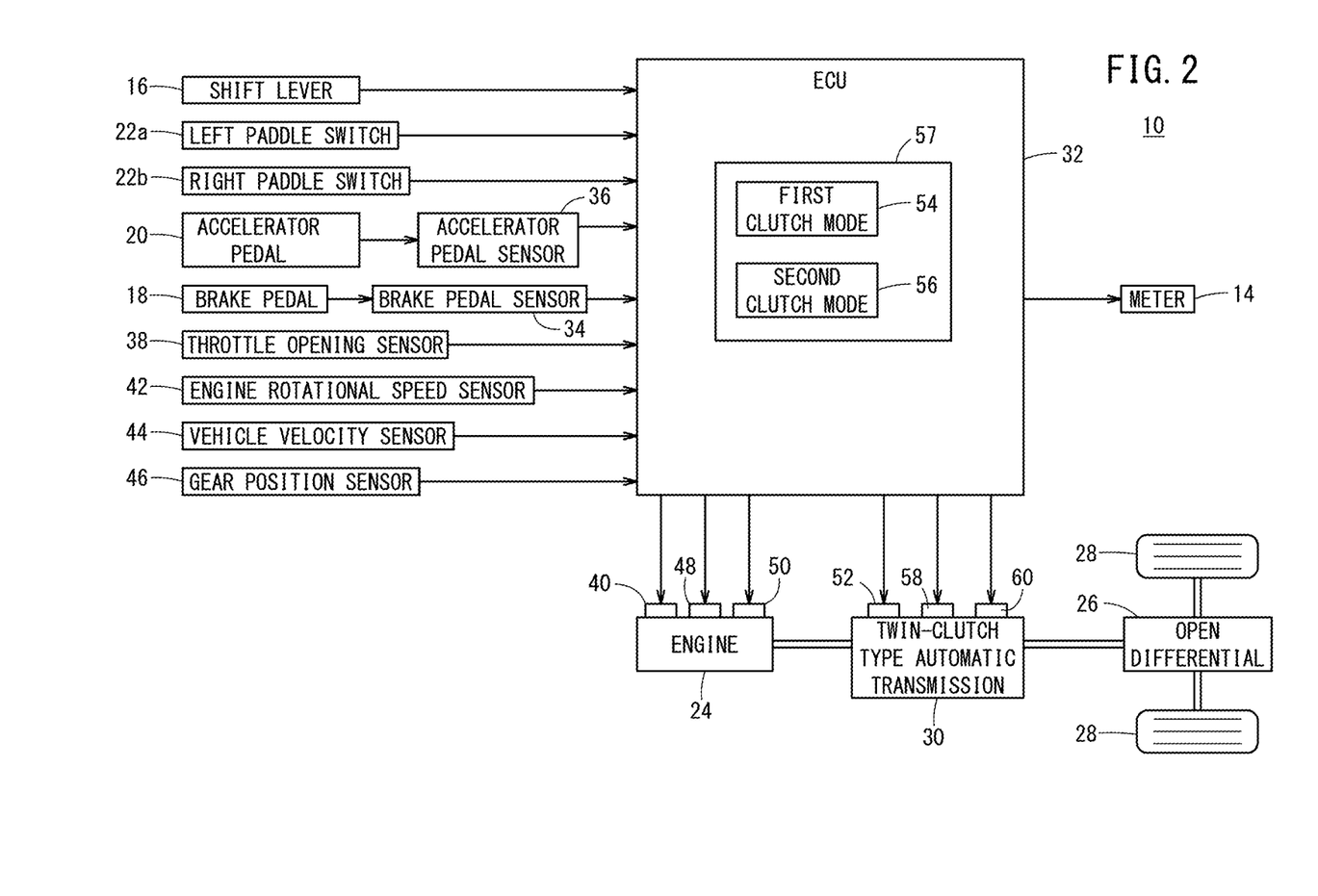
FIG. 2 is a block diagram of the rough terrain vehicle according to the present embodiment.

FIG. 2 is a block diagram of a rough terrain vehicle 10. The rough terrain vehicle 10 further includes an engine 24, and a twin-clutch type automatic transmission 30, which serves as an automatic transmission for transmitting the output of the engine 24 to vehicle wheels 28 via an open differential 26. The structures of the engine 24, the twin-clutch type automatic transmission 30, and the open differential 26 are well known, and therefore, detailed descriptions of such features are omitted. In the explanations given below, the twin-clutch type automatic transmission 30 may be referred to simply as an automatic transmission 30.

The engine 24 and the automatic transmission 30 are controlled by an ECU 32 which serves as a control unit. Detection signals from respective sensors disposed in the rough terrain vehicle 10, and command signals from respective operation units operated by the vehicle occupant are input to the ECU 32. The ECU 32 controls the engine 24 and the automatic transmission 30 on the basis of the detection signals and the command signals. Moreover, the ECU 32 is a computational device including a microcomputer, including as elements thereof a CPU (Central Processing Unit) and a memory, etc. The ECU 32 is capable of implementing the functions described below, by reading in and executing programs recorded in the memory as a non-transitory recording medium.

More specifically, in the case that the shift lever 16 is operated by a vehicle occupant, a command signal (sub-transmission signal) responsive to the operation result thereof is input to the ECU 32. The sub-transmission signal is a signal indicative of the shift position of the shift lever 16. In the present embodiment, the shift position includes, for example, a parking position (P range), a reverse position (R range), a neutral position (hereinafter also referred to as an N range, or N), and a drive position (D range). In the following description, the in-gear position refers to the D range. Further, the D range includes a high range (Hi range) and a low range (Lo range).

Further, in the case that the occupant operates the left paddle switch 22a or the right paddle switch 22b, and has instructed a shift-up or a shift-down operation with respect to the transmission gear stage of the automatic transmission 30, a command signal (shift-up signal or shift-down signal) responsive to the operation result thereof is input to the ECU 32.

More specifically, when the vehicle occupant operates the left paddle switch 22a, a shift-up signal to instruct up-shifting is output to the ECU 32. Further, when the vehicle occupant operates the right paddle switch 22b, a shift-down signal to instruct down-shifting is output to the ECU 32. Furthermore, when the vehicle occupant operates both the left paddle switch 22a and the right paddle switch 22b substantially simultaneously (pulls them roughly at the same time toward the side of the vehicle occupant), a command signal (clutch disengagement signal) to instruct disengagement (hereinafter also referred to as clutch disengagement) of the connection of the clutch that constitutes the automatic transmission 30 is output to the ECU 32.

Moreover, when the occupant separates his or her hand away from the left paddle switch 22a and/or the right paddle switch 22b, the left paddle switch 22a and/or the right paddle switch 22b returns to its initial position, and the output of the command signal to the ECU 32 from the left paddle switch 22a and/or the right paddle switch 22b is stopped. Stated otherwise, the command signals are output to the ECU 32 during the time period that the vehicle occupant is operating the left paddle switch 22a and/or the right paddle switch 22b.

A brake pedal sensor 34 detects an amount of depression of the brake pedal 18 by the vehicle occupant, and outputs the detected amount to the ECU 32. An accelerator pedal sensor 36 detects an amount of depression of the accelerator pedal 20 by the vehicle occupant, and outputs the detected amount to the ECU 32.

A throttle opening sensor 38 detects a degree of opening (throttle opening) of a throttle valve 40, and outputs the detected degree of opening to the ECU 32. An engine rotational speed sensor 42 detects an engine rotational speed Ne of the engine 24, and outputs the detected engine rotational speed Ne to the ECU 32. A vehicle velocity sensor 44 detects the vehicle velocity of the rough terrain vehicle 10, and outputs the detected vehicle velocity to the ECU 32. A gear position sensor 46 detects a transmission gear stage, which is a gear position of the automatic transmission 30, and outputs the detected transmission gear stage to the ECU 32. The ECU 32 displays the engine rotational speed Ne, the vehicle velocity, and the transmission gear stage on the screen of the meter 14.

On the basis of the respective detection signals from the brake pedal sensor 34, the accelerator pedal sensor 36, the throttle opening sensor 38, the engine rotational speed sensor 42, and the vehicle velocity sensor 44, the ECU 32 adjusts the degree of opening of the throttle, supplies control signals to an injector 48 whereby fuel is injected therefrom, and further supplies ignition signals to an ignition coil 50 in order to ignite a spark plug.

Further, in the case that the shift lever 16 is in the D range, which is the in-gear position, at the time that the shift-up signal or the shift-down signal is input from the left paddle switch 22a or the right paddle switch 22b, the ECU 32 supplies, to a shift motor 52, a drive signal responsive to the shift-up signal or the shift-down signal that was input thereto. On the basis of the drive signal, the shift motor 52 rotates a non-illustrated shift drum inside the automatic transmission 30. By rotation of the shift drum, a shift fork is displaced in the axial direction of the shift drum, and engagement between a gear of a counter shaft and gears of main shafts changes, whereby a shift-up or a shift-down action is executed.

Furthermore, the ECU 32 includes a map 57 therein comprising a first clutch mode 54 and a second clutch mode 56, which exhibit respective relationships between the engine rotational speed Ne and a hydraulic pressure (clutch hydraulic pressure amount) of the clutch that makes up the automatic transmission 30. In comparison with the second clutch mode 56, the first clutch mode 54 is set so that the hydraulic pressure (clutch hydraulic pressure amount) is lower with respect to the same engine rotational speed Ne.

In addition, the ECU 32 controls engagement and disengagement of the clutch of the automatic transmission 30 in accordance with whether or not the left paddle switch 22a and the right paddle switch 22b are pulled substantially at the same time toward the side of the vehicle occupant (i.e., whether or not a clutch disengagement signal is input to the ECU 32).

More specifically, if the left paddle switch 22a and the right paddle switch 22b are not pulled substantially at the same time toward the side of the vehicle occupant, and the clutch disengagement signal is not input to the ECU 32, the ECU 32 determines that it is necessary to keep the clutch in a connected or engaged state. In addition, with reference to the first clutch mode 54 or the second clutch mode 56 of the map 57, the ECU 32 sets the hydraulic pressure (target hydraulic pressure) corresponding to the engine rotational speed Ne. In this case, the ECU 32 supplies to a first valve 58 and a second valve 60, which are in the form of linear solenoid valves, relatively high level drive signals responsive to the target hydraulic pressure. When the first valve 58 and the second valve 60 are opened in accordance with the drive signals, hydraulic pressure is applied from a non-illustrated oil tank to the clutch, whereupon the clutch is placed in an engaged state.

On the other hand, in the case that the left paddle switch 22a and the right paddle switch 22b are pulled roughly simultaneously toward the side of the vehicle occupant, and the clutch disengagement signal is input to the ECU 32, the ECU 32 determines that an instruction has been issued to disengage the clutch, and with reference to the first clutch mode 54 or the second clutch mode 56, the target hydraulic pressure is set corresponding to the engine rotational speed Ne. In this case, the ECU 32 supplies to the first valve 58 and the second valve 60 low level drive signals responsive to the target hydraulic pressure, and the first valve 58 and the second valve 60 are operated in directions to close. Consequently, application of the hydraulic pressure to the clutch is suspended, and the clutch becomes disengaged.

Moreover, in the present embodiment, at a time prior to start of movement of the rough terrain vehicle 10 (when preparing to start movement), the ECU 32 refers to the first clutch mode 54, and sets the target hydraulic pressure corresponding to the engine rotational speed Ne. On the other hand, at a time of travel of the rough terrain vehicle 10 (when starting to move), the ECU 32 refers to the second clutch mode 56, and sets the target hydraulic pressure corresponding to the engine rotational speed Ne. More specifically, in the map 57, there are included two gear-shifting modes (first clutch mode 54, second clutch mode 56), and concerning the single map 57, prior to start of movement or upon starting to move, the ECU 32 switches to the first clutch mode 54 or the second clutch mode 56, and sets the target hydraulic pressure corresponding thereto. Further, in the present embodiment, it should be kept in mind that the phrase "disengages the clutch" may defined a state in which the clutch is completely disengaged, or may be defined by the concept of a half-clutch state, which is a state in which the clutch is not completely engaged.

Operations of the Present Embodiment

Next, a description will be given with reference to the timing chart of FIG. 3 concerning operations of the rough terrain vehicle 10 according to the present embodiment. In the following explanations, as necessary, descriptions will be made with reference to FIGS. 1 and 2.

At first, in a state in which the rough terrain vehicle 10 is stopped, at time t0, the vehicle occupant operates the shift lever 16, and puts the vehicle in gear in the D range. Consequently, a sub-transmission signal which is input to the ECU 32 is switched from a signal (N) indicative of a neutral position to a signal (H) indicative of an in-gear position (D range). In this case, the ECU 32 refers to the second clutch mode 56, and sets the target hydraulic pressure corresponding to the engine rotational speed Ne (Ne≈0).

Next, at time t1, when the vehicle occupant pulls the left paddle switch 22a and the right paddle switch 22b substantially at the same time toward the side of the vehicle occupant (toward the vehicle occupant), the clutch disengagement signal is input to the ECU 32. On the basis of the clutch disengagement signal input thereto, the ECU 32 determines that an instruction has been issued to disengage the clutch. In addition, the ECU 32 switches from the second clutch mode 56 to the first clutch mode 54, and the ECU 32 decides to set the hydraulic pressure while referring to the first clutch mode 54 that was switched to.

Thereafter, the ECU 32 refers to the first clutch mode 54, and sets the target hydraulic pressure corresponding to the engine rotational speed Ne, whereupon a drive signal corresponding to the set target hydraulic pressure is supplied to the first valve 58 and the second valve 60. As a result, since the first valve 58 and the second valve 60 are closed, application of the hydraulic pressure to the clutch is stopped, and the clutch becomes disengaged.

Next, at time t2, in a state in which the left paddle switch 22a and the right paddle switch 22b are pulled toward the front of the vehicle occupant, the accelerator pedal 20 is depressed with the right foot. In this case, the accelerator pedal sensor 36 detects an amount of depression of the accelerator pedal 20 by the vehicle occupant, and outputs the detected amount to the ECU 32.

Corresponding to the amount of depression of the accelerator pedal 20, the ECU 32 adjusts the throttle opening of the throttle valve 40, controls the injector 48 whereby fuel is injected therefrom, and further supplies ignition signals to the ignition coil 50 in order to ignite the spark plug. Consequently, the throttle opening becomes larger accompanying the passage of time from time t2. Further, the engine rotational speed Ne, in following relation to the increase in the throttle opening, rises over time from time t3.

In this case, since the automatic transmission 30 is in a state with the clutch thereof disengaged, power transmission between the engine 24 and the open differential 26 is blocked. Therefore, the output of the engine 24 is not transmitted to the vehicle wheels 28. More specifically, in a time zone from time t1 until time t5, the rough terrain vehicle 10 does not start moving.

In addition, while the vehicle occupant confirms the engine rotational speed Ne displayed on the meter 14, the occupant continues depressing the accelerator pedal 20 so as to maintain a desired high engine rotational speed Ne. Consequently, in a time zone from time t4 until time t5, the throttle opening is maintained at a predetermined degree of opening, and the engine rotational speed Ne increases and decreases over time within a fixed range.

On the other hand, in a time zone from time t1 until time t5, the ECU 32 refers to the first clutch mode 54, and sets the target hydraulic pressure corresponding to the engine rotational speed Ne, whereupon a drive signal corresponding to the set target hydraulic pressure is supplied to the first valve 58 and the second valve 60. In accordance therewith, the first valve 58 and the second valve 60 are maintained in the closed state. As a result, the clutch hydraulic pressure is kept at a low level value corresponding to the target hydraulic pressure.

Figure 3:
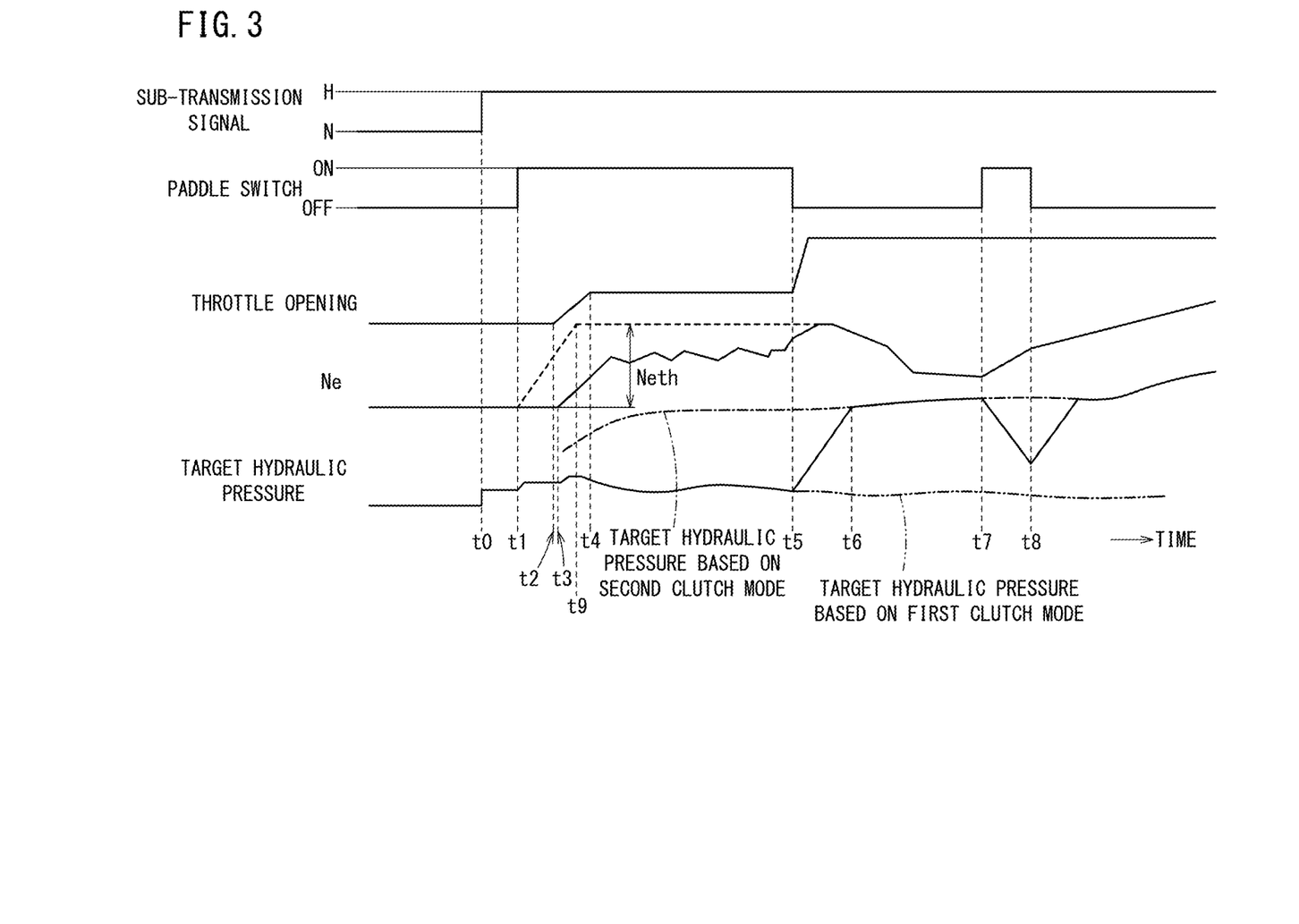
FIG. 3 is a timing chart for describing operations when preparing to start and upon starting of the rough terrain vehicle.

In FIG. 3, there are illustrated, respectively, a timewise change of the target hydraulic pressure corresponding to the engine rotational speed Ne on the basis of the first clutch mode 54 as indicated by the two-dot-dashed line, a timewise change of the target hydraulic pressure corresponding to the engine rotational speed Ne on the basis of the second clutch mode 56 as indicated by the one-dot-dashed line, and a timewise change of the target hydraulic pressure set by the ECU 32 as indicated by the solid line.

At time t5, the left paddle switch 22a and the right paddle switch 22b are returned to their initial positions, and the accelerator pedal 20 is further depressed with the right foot. As a result, the ECU 32 determines that the vehicle occupant has an intention to start movement. Next, the ECU 32 increases the target hydraulic pressure at a constant rate over time, in order to switch from the first clutch mode 54 to the second clutch mode 56.

As a result, in a time zone from time t5 until time t6, the ECU 32 increases the target hydraulic pressure without using the first clutch mode 54 and the second clutch mode 56, and supplies, to the first valve 58 and the second valve 60, drive signals corresponding to the increased target hydraulic pressure. The first valve 58 and the second valve 60 are opened on the basis of the drive signals, whereby hydraulic pressure is applied to the clutch. As a result, the clutch is brought into an engaged state.

The engine rotational speed Ne is maintained at a high speed of rotation until immediately before start of movement (time t5). Therefore, by the clutch being placed in an engaged state, the output of the engine 24 is transmitted to the vehicle wheels 28 through the automatic transmission 30 and the open differential 26. As a result, at time t5 and thereafter, the rough terrain vehicle 10 starts to move (is started rapidly) with rapid acceleration.

Moreover, immediately after time t5, the vehicle occupant further depresses the accelerator pedal 20, and such a condition is maintained in order to rapidly initiate movement of the rough terrain vehicle 10. Consequently, although immediately after time t5, the throttle opening becomes larger accompanying the passage of time, thereafter, the throttle opening is maintained at a constant value. Further, when the value of the target hydraulic pressure is increased at a constant rate and reaches the value of the target hydraulic pressure based on the second clutch mode 56 at time t6, the ECU 32 switches over to the second clutch mode 56. Consequently, following start of movement of the rough terrain vehicle 10, the ECU 32 refers to the second clutch mode 56, and sets the target hydraulic pressure corresponding to the engine rotational speed Ne.

During traveling of the rough terrain vehicle 10, in the event that the engine rotational speed Ne is decreased, or even while currently traveling, if the occupant wishes to realize a feeling of rapid acceleration upon starting, at time t7, the vehicle occupant may pull the left paddle switch 22a and the right paddle switch 22b toward himself substantially at the same time.

Consequently, in a time zone from time t7 until time t8, in the same manner as at the time of preparation for start of movement (the time zone from time t1 to time t5), the ECU 32 sets the target hydraulic pressure using the first clutch mode 54. Further, in this time zone, the clutch is either disengaged or is maintained in a half-clutch state, and the engine rotational speed Ne rises.

As a result, at time t8, when the vehicle occupant returns the left paddle switch 22a and the right paddle switch 22b to their initial positions, the clutch is engaged, and an output of a high engine rotational speed Ne is transmitted to the vehicle wheels 28 through the automatic transmission 30 and the open differential 26. Consequently, at time t8 and thereafter, the rough terrain vehicle 10 can be rapidly accelerated again.

Further, at the time of preparation for start of movement of the rough terrain vehicle 10, concerning a timewise change of the engine rotational speed Ne, the ECU 32 may carry out the control shown by the dashed line in FIG. 3.

More specifically, after the clutch disengagement signal has been input to the ECU 32 at time t1, the engine rotational speed Ne rises rapidly over time, and upon reaching a predetermined rotational speed threshold Neth at time t9, the ECU 32 controls the injector 48, and executes a fuel injection cut with respect to the engine 24. Owing thereto, at time t1 and thereafter, the engine rotational speed Ne is maintained at the rotational speed threshold Neth. Consequently, in the case that the clutch is engaged at time t5, the rough terrain vehicle 10 is capable of being started suddenly at a high engine rotational speed Ne (at the rotational speed threshold Neth).

Advantages and Effects of the Present Embodiment

As has been described above, in accordance with the rough terrain vehicle 10 according to the present embodiment, when preparing to start movement of the rough terrain vehicle 10, during a time that the left paddle switch 22a and the right paddle switch 22b are operated together with the accelerator pedal 20, the clutch of the automatic transmission 30 is disengaged, and the output of the engine 24 is made to increase. Consequently, before starting movement of the rough terrain vehicle 10, and in a state in which the rough terrain vehicle 10 is stopped, a high engine rotational speed Ne can be maintained without transmitting the output of the engine 24 to the vehicle wheels 28.

On the other hand, when movement is started, at a time that operation of the left paddle switch 22a and the right paddle switch 22b is canceled, the clutch is engaged, and the output of the engine 24 is transmitted from the engine 24 to the vehicle wheels 28 via the automatic transmission 30 and the open differential 26. In this case, since up to a time immediately before movement is started, the engine 24 is maintained at a high engine rotational speed Ne, by the vehicle occupant operating the accelerator pedal 20 and setting the throttle at an arbitrary throttle opening, the ability to accelerate the rough terrain vehicle 10 upon start of movement can be enhanced.

Thus, in accordance with the present embodiment, in a rough terrain vehicle 10 in which the automatic transmission 30 is incorporated, but a TBW mechanism is not incorporated therein, by controlling the engine 24 and the automatic transmission 30 on the basis of operations of the left paddle switch 22a and the right paddle switch 22b as well as the accelerator pedal 20 by the vehicle occupant, the rough terrain vehicle 10 can start to move in a state in which the ability of the rough terrain vehicle 10 to accelerate is enhanced.

Further, when preparing to start movement, the target hydraulic pressure corresponding to the engine rotational speed Ne is set on the basis of the first clutch mode 54. On the other hand, when movement is started, the target hydraulic pressure corresponding to the engine rotational speed Ne is set on the basis of the second clutch mode 56. Thus, it is possible to efficiently control engagement and disengagement of the clutch that constitutes the automatic transmission 30.

Further, the target hydraulic pressure of the first clutch mode 54 is set to be lower than the target hydraulic pressure of the second clutch mode 56 with respect to the same engine rotational speed Ne. Thus, when preparing to start movement, the automatic transmission 30 is placed in a half-clutch state, and the engine rotational speed Ne can be raised to the greatest extent possible, to a degree at which the rough terrain vehicle 10 does not actually start to move. As a result, by connecting or fully engaging the clutch at the time of starting, it is possible to initiate movement of the rough terrain vehicle 10.

Further still, by operating the left paddle switch 22a and the right paddle switch 22b during traveling of the rough terrain vehicle 10, the same conditions are kept as during the time of undertaking preparations for start of movement, and thereafter, if operation of the left paddle switch 22a and the right paddle switch 22b is canceled, the rough terrain vehicle 10 is accelerated again. In accordance with this feature, even in the case that the engine rotational speed Ne is decreased during traveling, the engine rotational speed Ne can easily be raised, and the rough terrain vehicle 10 can be made to accelerate again. Further, during traveling, the occupant can again realize the sense of acceleration.

By the vehicle occupant operating the accelerator pedal 20 during the time of preparations for start of movement of the rough terrain vehicle 10, although the output of the engine 24 with respect to the engine rotational speed Ne becomes greater up to a certain fixed value, thereafter, the output of the engine 24 decreases. As a result, when the clutch is fully engaged in a state with the output of the engine 24 being decreased, it becomes difficult to start movement of the rough terrain vehicle 10. Further, since a TBW mechanism is not incorporated in the rough terrain vehicle 10, adjustment of the throttle valve 40 also is difficult.

Thus, with the present embodiment, during the time of preparing to start movement, in the case that the engine rotational speed Ne is greater than or equal to the rotational speed threshold Neth, fuel injection to the engine 24 is cut, and the engine rotational speed Ne is maintained at the rotational speed threshold Neth. Owing thereto, during preparations for start of movement, the engine rotational speed Ne is maintained at the rotational speed threshold Neth corresponding to a maximum output of the engine 24. As a result, since the clutch is fully engaged at time t5, in a state in which the engine 24 is maintained at maximum output, the rough terrain vehicle 10 possesses a high capability to accelerate, and movement thereof can be easily started.

Further, since the vehicle occupant can depress the accelerator pedal 20 while operating the left paddle switch 22a and the right paddle switch 22b and simultaneously gripping the handle 12, ease of operation of the rough terrain vehicle is enhanced. As a result, during preparations for starting and at the time of start of movement, responsive to the operations of the occupant, appropriate controls can be effected with respect to the engine 24 and the automatic transmission 30.

Furthermore, the left paddle switch 22a and the right paddle switch 22b are disposed respectively on both left and right sides of the handle 12, and at a time that both switches are pulled toward the side of the vehicle occupant and the accelerator pedal 20 is depressed, the clutch is disengaged and the output of the engine 24 is made to increase. Consequently, it is possible to efficiently raise the engine rotational speed Ne at the time of undertaking preparations for start of movement. On the other hand, when the left paddle switch 22a and the right paddle switch 22b are returned to their initial positions, since the clutch is engaged and the output of the engine 24 is transmitted to the vehicle wheels 28 through the automatic transmission 30 and the open differential 26, it is possible to start movement of the rough terrain vehicle 10 with a strong capability of accelerating.

Although the description of the present invention has been presented above on the basis of a preferred embodiment, the technical scope of the present invention is not limited to the disclosed scope of the above-described embodiment. It will be apparent to those skilled in the art that various improvements or modifications can be made with respect to the aforementioned embodiment. Moreover, it should be evident from the scope of the claims that configurations, which are based on such improvements or modifications, also fall within the technical scope of the present invention. Further, the parenthetical reference characters, which are referred to in the patent claims, correspond with the reference characters shown in the accompanying drawings for thereby facilitating understanding of the present invention. However, the present invention should not be construed as being limited to the elements denoted by such reference characters.

What is claimed is:

1. A rough terrain vehicle having an engine and an accelerator operating unit operated by a vehicle occupant, comprising:
   a clutch type automatic transmission configured to transmit an output of the engine to vehicle wheels;
   a clutch operating unit operated by the vehicle occupant; and
   a control unit configured to control traveling of the rough terrain vehicle, by controlling the engine and the clutch type automatic transmission on basis of operations of the accelerator operating unit and/or the clutch operating unit by the vehicle occupant;
   a first clutch mode and a second clutch mode which exhibit respective relationships between an engine rotational seed of the engine and a clutch hydraulic pressure amount of the clutch of the clutch type automatic transmission, wherein in comparison with the second clutch mode, the first clutch mode exhibits a smaller clutch hydraulic pressure amount with respect to a same engine rotational speed, wherein the control unit:

at a time of preparing to start movement of the rough terrain vehicle, in a case that the clutch operating unit and the accelerator operating unit are operated, sets the clutch hydraulic pressure amount corresponding to the engine rotational speed on basis of the first clutch mode, disengages the clutch, and causes the output of the engine to increase;

whereas at a time of starting movement of the rough terrain vehicle, in a case that operation of the clutch operating unit is canceled, sets the clutch hydraulic pressure amount corresponding to the engine rotational speed on basis of the second clutch mode, engages the clutch, and transmits the output of the engine from the engine to the vehicle wheels via the clutch type automatic transmission, to thereby start movement of the rough terrain vehicle, at a time of transitioning from preparing to start the movement to starting the movement of the rough terrain vehicle, in a case that the operation of the clutch operating unit is canceled, increases the clutch hydraulic pressure amount at a constant rate without using the first clutch mode and the second clutch mode, and in a case that the clutch hydraulic pressure amount reaches a second-clutch-mode-based clutch hydraulic pressure amount, sets the clutch hydraulic pressure amount corresponding to the engine rotational speed on basis of the second clutch mode.

2. The rough terrain vehicle according to claim 1, wherein the control unit:

in a case that the clutch operating unit is operated by the vehicle occupant during traveling of the rough terrain vehicle, sets the clutch hydraulic pressure amount corresponding to the engine rotational speed on basis of the first clutch mode; and thereafter, in a case that operation of the clutch operating unit is canceled, sets the clutch hydraulic pressure amount corresponding to the engine rotational speed on basis of the second clutch mode, to thereby engage the clutch and transmit the output of the engine from the engine to the vehicle wheels via the clutch type automatic transmission, whereby the rough terrain vehicle is accelerated again.

3. The rough terrain vehicle according to claim 1, wherein, during the time of preparing to start movement, in a case that the engine rotational speed is greater than or equal to a predetermined rotational speed, the control unit cuts fuel injection to the engine, and maintains the engine rotational speed at the predetermined rotational speed.

4. The rough terrain vehicle according to claim 1, wherein:

the accelerator operating unit is an accelerator pedal; and the clutch operating unit is a paddle shift disposed on a handle steered by the vehicle occupant;

wherein the control unit:

at the time of preparing to start movement, in a case that the accelerator pedal is depressed together with the paddle shift being operated, disengages the clutch and causes the output of the engine to increase; and at the time of starting movement, in a case that the paddle shift is returned to its initial position, engages the clutch and transmits the output of the engine from the engine to the vehicle wheels via the clutch type automatic transmission.

5. The rough terrain vehicle according to claim 4, wherein:

the paddle shift is disposed on each of both left and right sides of the handle;

wherein the control unit:

at the time of preparing to start movement, in a case that the accelerator pedal is depressed together with the paddle shift on each of the sides being operated, disengages the clutch and causes the output of the engine to increase; and at the time of starting movement, in a case that the paddle shift on each of the sides is returned to its initial position, engages the clutch and transmits the output of the engine from the engine to the vehicle wheels via the clutch type automatic transmission.

* * * * *